(12) United States Patent
Yamada

(10) Patent No.: US 8,497,896 B2
(45) Date of Patent: Jul. 30, 2013

(54) TRANSMITTER, RECEIVER AND TRANSMISSION SYSTEM

(75) Inventor: Masahiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/183,369

(22) Filed: Jul. 14, 2011

(65) Prior Publication Data

US 2012/0154530 A1 Jun. 21, 2012

(30) Foreign Application Priority Data

Dec. 21, 2010 (JP) ................................ 2010-284666

(51) Int. Cl.
*H04N 13/00* (2006.01)

(52) U.S. Cl.
USPC .......................................................... 348/43

(58) Field of Classification Search
USPC .................................................... 348/42–49
IPC ..................................................... H04N 13/00
See application file for complete search history.

(56) References Cited

U.S. PATENT DOCUMENTS

| 5,784,097 A | 7/1998 | Iinuma et al. |
| 7,554,608 B2 | 6/2009 | Kawamura |
| 2009/0142041 A1 | 6/2009 | Nagasawa et al. |
| 2010/0118120 A1 | 5/2010 | Takahashi et al. |
| 2010/0272417 A1* | 10/2010 | Nagasawa et al. .............. 386/97 |
| 2011/0149036 A1* | 6/2011 | Suh et al. ......................... 348/43 |
| 2012/0044241 A1* | 2/2012 | Chen et al. ..................... 345/419 |
| 2012/0050473 A1* | 3/2012 | Suh et al. ......................... 348/43 |
| 2012/0092450 A1* | 4/2012 | Choi et al. ....................... 348/43 |
| 2012/0113113 A1* | 5/2012 | Hong ............................. 345/419 |

FOREIGN PATENT DOCUMENTS

| JP | 08-331598 A | 12/1996 |
| JP | 11-164329 A | 6/1999 |
| JP | 2004-166017 | 6/2004 |
| JP | 2004-274642 | 9/2004 |
| JP | 2006-195018 | 7/2006 |
| JP | 2009-105798 | 5/2009 |
| JP | 2009-135686 A | 6/2009 |
| JP | 2010-114861 | 5/2010 |
| WO | WO 2004/090860 | 10/2004 |

OTHER PUBLICATIONS

Japanese Office Action dated Nov. 29, 2011 for Japanese Application No. 2010-284666 filed on Dec. 21, 2010.

* cited by examiner

*Primary Examiner* — Tung Vo

(74) *Attorney, Agent, or Firm* — Knobbe, Martens, Olson & Bear LLP

(57) ABSTRACT

According to one embodiment, according to one embodiment, a transmitter includes a first scaling module and a multiplexer. The first scaling module is configured to scale an image signal to a first resolution. The multiplexer is configured to assign a signal value of the scaled image signal, a signal value of an OSD (On Screen Display) to be superimposed on the image signal, blend information of the OSD and depth information of the OSD at predetermined positions in a transmission signal having a second resolution larger than the first resolution.

10 Claims, 11 Drawing Sheets

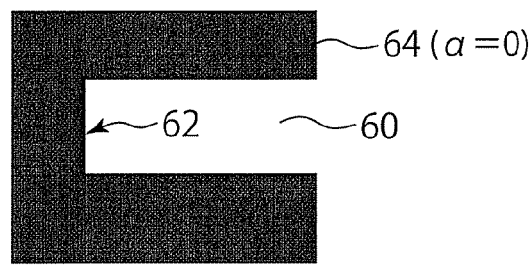
FIG. 7
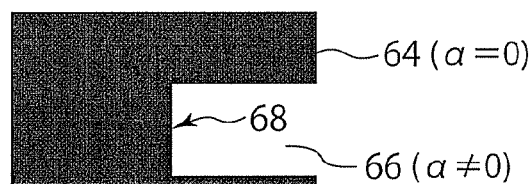
FIG. 8A
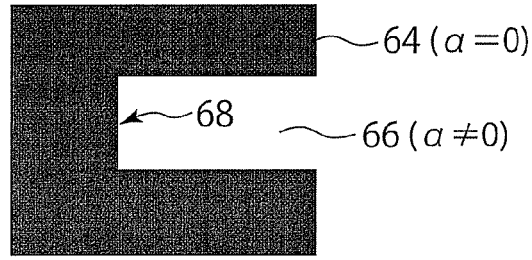
FIG. 8B
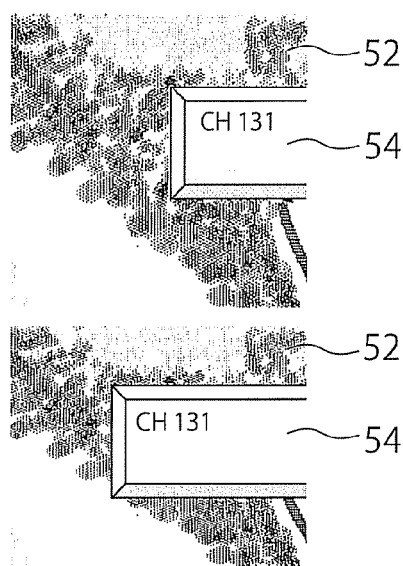
FIG. 9A
FIG. 9B

| (0,0) Video Depth | (1,0) Video Depth | | (639,0) Video Depth |
|---|---|---|---|
| (0,2) Video Depth | (1,2) Video Depth | | (639,2) Video Depth |
| (0,718) Video Depth | (1,718) Video Depth | | (639,718) Video Depth |

TRANSMITTER, RECEIVER AND TRANSMISSION SYSTEM

CROSS REFERENCE TO RELATED APPLICATIONS

This application is based upon and claims the benefit of priority from the prior Japanese Patent Application No. 2010-284666, filed on Dec. 21, 2010, the entire contents of which are incorporated herein by reference.

FIELD

Embodiments described herein relate generally to a transmitter, a receiver and a transmission system.

BACKGROUND

Recently, three-dimensional display devices displaying an image signal three-dimensionally have been widely used. Each pixel of a three-dimensional image has depth information in addition to an R (red) brightness value, a G (green) brightness value and a B (blue) brightness value. Furthermore, it is desirable that the three-dimensional image display displays a three-dimensional OSD (On Screen Display) which is a menu setting screen, and so on. Each pixel of the OSD has R, G and B brightness values, blend information indicative of a blend ratio between the image signal and the OSD, and depth information.

A circuit for generating the OSD and a circuit for superimposing the OSD on the image signal may be integrated on two different chips. In the three-dimensional display device, it is necessary to transmit not only the R, G and B brightness values and the blend information, but also depth information. Therefore, there is a problem that the transmission system may be complicated.

BRIEF DESCRIPTION OF THE DRAWINGS

FIG. 7 is a diagram for explaining the blend information of the OSD according to one embodiment.

FIGS. 8A and 8B are diagrams for explaining the blend information of the OSD for left eye and for right eye respectively according to one embodiment.

FIGS. 9A and 9B are parallax images for left eye and for right eye obtained by using the blend information explained on FIGS. 8A and 8B.

FIGS. 19A and 19B are diagrams showing an example of arrangement of the blend information α and the depth information of the scaled OSD sorted by the sorting module 13b.

DETAILED DESCRIPTION

In general, according to one embodiment, a transmitter includes a first scaling module and a multiplexer. The first scaling module is configured to scale an image signal to a first resolution. The multiplexer is configured to assign a signal value of the scaled image signal, a signal value of an OSD (On Screen Display) to be superimposed on the image signal, blend information of the OSD and depth information of the OSD at predetermined positions in a transmission signal having a second resolution larger than the first resolution.

Embodiments will now be explained with reference to the accompanying drawings.

First Embodiment

Figure 1:
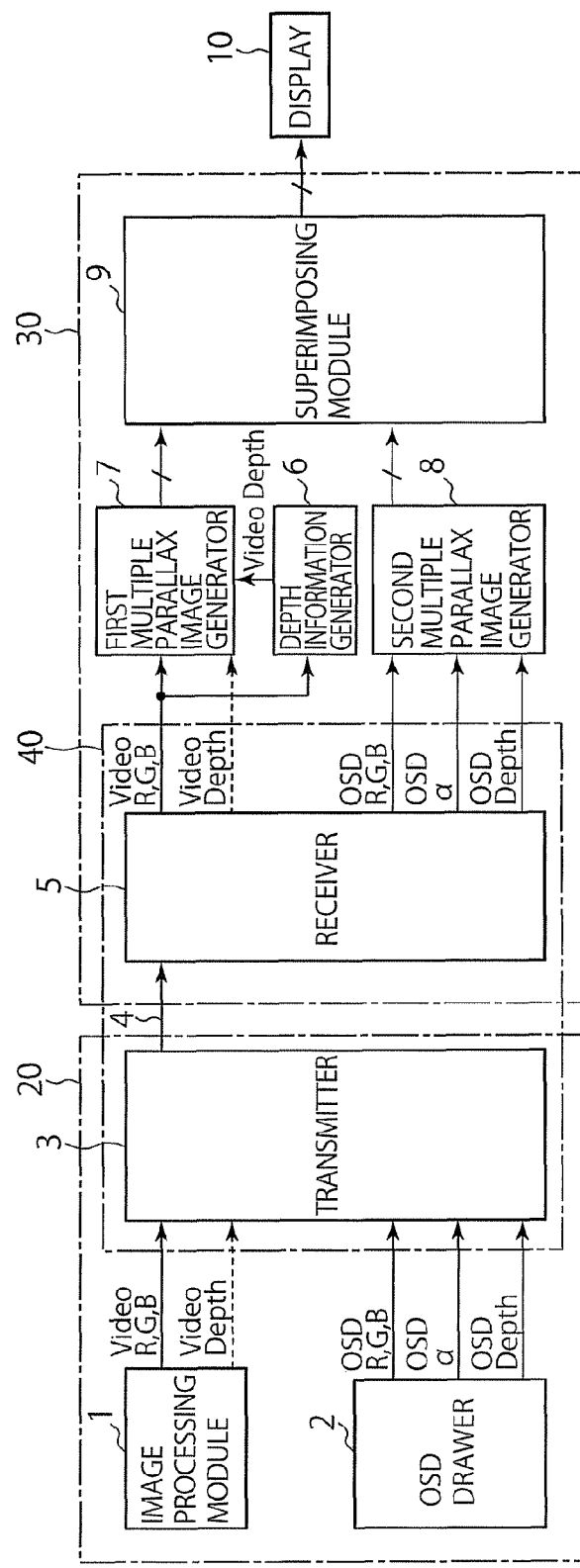
FIG. 1 is a schematic block diagram of a display system according to a first embodiment.

FIG. 1 is a schematic block diagram of a display system according to a first embodiment. The display system has an image signal processing module 1, an OSD drawer 2, a transmitter 3, a transmission path 4, a receiver 5, a depth information generator 6, a first multiple parallax image generator 7, a second multiple parallax image generator 8, a superimposing module 9 and a display 10.

The image signal processing module 1, the OSD drawer 2 and the transmitter 3 are integrated in a first chip 20 such as an SoC (System on Chip), while the receiver 5, the depth information generator 6, the first multiple parallax image generator 7, the second multiple parallax image generator 8 and the superimposing module 9 are integrated in a second chip 30. For example, the first chip 20 is mounted on a video outputting module of a tuner or a personal computer, and the second chip 30 is mounted on a side of the display 10. The transmitter 3, the transmission path 4 and the receiver 5 form a transmission system 40.

An encoded two-dimensional video signal is inputted to the image signal processing module 1 through a broadcast or network, for example. The image signal processing module 1 decodes the encoded two-dimensional video signal to generate a decoded two-dimensional video signal. The two-dimensional video signal includes brightness values R, G and B (Video R, G, B) of each pixel, for example.

Furthermore, encoded multiple parallax image signals can be inputted to the image signal processing module 1. In this case, the image signal processing module 1 decodes the encoded multiple parallax image signals to generate decoded multiple parallax image signals. The multiple parallax images include brightness values R, G and B (Video R, G, B) and depth information (Video Depth) of each pixel, for example.

Hereinafter, the brightness values R, G and B and the depth information of the video signal will be referred to as video signal information as a whole. The two-dimensional video signal or the multiple parallax image signals generated by the image signal processing module 1 is transmitted to the first multiple parallax image generator 7 through the transmission system 40 mentioned below.

The OSD drawer 2 draws or sets an OSD which is, for example, a channel number or a menu setting screen. The OSD includes a graphic image in addition to the menu setting image and so on. The OSD includes brightness values R, G and B (OSD R, G, B) of each pixel. In the present embodiment, the OSD area is displayed so that the OSD area is seen near-side from the display 10 in order to highlight the OSD area when the OSD is displayed on the display 10. Therefore, the OSD includes depth information (OSD depth) of each pixel. The depth information included in the OSD can be configured to be modified or changed by a user's operation on the menu screen. By such a configuration, the user can arbitrarily control how the OSD is seen when the OSD is displayed.

The OSD further includes blend information α (OSD α) of each pixel. The blend information α is used for, what is called, alpha-blend and indicates a ratio for blending the OSD with the background. When the blend information α is expressed by "n" bit, the blend information α can be an integer of $0 \leq \alpha \leq 2^{n-1}$. Note that, the depth information can be inputted when the SOD is drawn or set, or generated by the OSD drawer 2 using a software.

Figure 2:
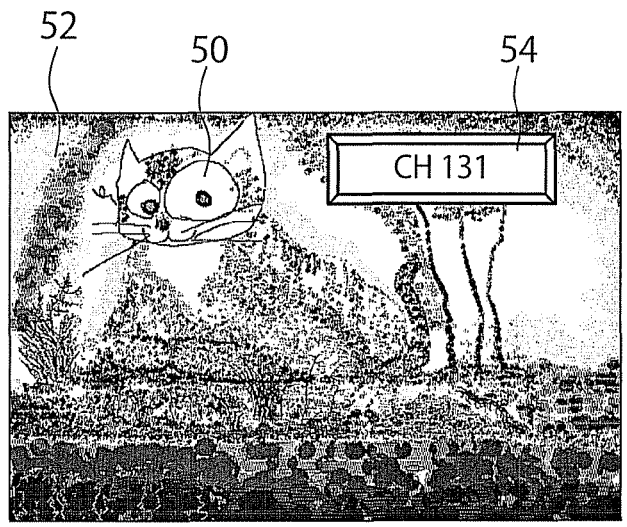
FIG. 2 is a diagram where the OSD is superimposed on the two-dimensional video signal.

By superimposing the OSD simply on the decoded video signal to display it on the display 10, FIG. 2 can be obtained, for example. In FIG. 2, "CH 131" attached the reference numeral 54 shows the OSD. This OSD 54 indicates a channel number in FIG. 2.

Hereinafter, the brightness values R, G and B, the blend information α and the depth information of the OSD will be referred to as OSD information. The OSD information drawn or set by the OSD drawer 2 is transmitted to the second multiple parallax image generator 8 through the transmission system 40.

The transmission system 40 having the transmitter 3, the transmission path 4 and the receiver 5 transmits the video signal received by the image signal processing module 1 to the first multiple parallax image generator 7, and transmits the OSD drawn or set by the OSD drawer 2 to the second multiple parallax image generator 8. One of the characteristic features of the present embodiment is the transmission system 40, which will be explained below in detail.

The depth information generator 6 analyses the decoded two-dimensional video signal or multiple parallax image signals to generate the depth information of the image and transmits it to the first multiple parallax image generator 7.

Figure 3:
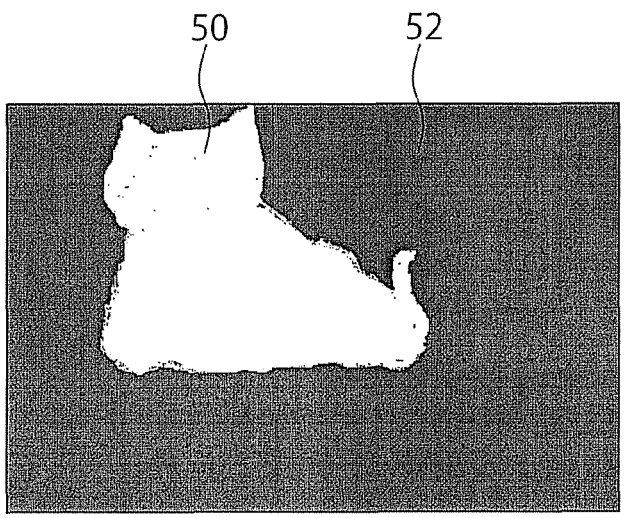
FIG. 3 is a diagram for explaining a manner where the depth information is generated from the two-dimensional image of FIG. 2.

For example, the depth information generator 6 generates the depth information of an object (for example, a cat) 50 from the two-dimensional image shown in FIG. 2. The depth information generator 6 generates the depth information based on a known manner. For example, a background area 52 is separated from the object 50 in the other area, and a representative motion vector of the background area 52 is calculated based on a motion vector of the two-dimensional image and that of the background area 52. Next, a relative motion vector is calculated by subtracting the representative motion vector from the motion vector of the two-dimensional image. Then, using the relative motion vector, the depth information of the object 50 in the two-dimensional image is generated as shown in FIG. 3. Note that, the depth information of an object nearer from the display 10 (for example, the object 50 of FIG. 2) is set larger than that of an object farther from the display 10 (for example, the background area 52 of FIG. 2).

When the video signal generated by the image signal processing module 1 includes the depth information, it is enough to transmit the depth information to the first multiple parallax image generator 7 directly and the above processing of the depth information generator 6 is unnecessary.

The first multiple parallax image generator 7 generates multiple parallax images using the depth information generated by the depth information generator 6 or that transmitted from the image signal processing module 1. For example, when the first chip 20 and the second chip 30 of the present embodiment is used for stereoscopic display with glasses, two parallax images are generated, while when the image processing device of the present embodiment is used for autostereoscopic display, for example first to ninth parallax images seen from nine direction including a central viewpoint. Because an object having large depth information (for example, the object 50 in FIG. 2), namely, present at near-side is seen shifted to the right side comparing to background area 52 in a parallax image seen from a left direction, the first multiple parallax image generator 7 shifts such object to the right side to generate the parallax image seen from the left direction. On the other hand, the first multiple parallax image generator 7 shifts the object to the left side to generate a parallax image seen from a right direction. By such a manner, generated are two parallax images or nine parallax images seen from nine viewpoints arranged on the horizontal direction from left to right. By shifting the object to generate the parallax images, the image on the background should be seen by the nature. However, since the inputted image does not have the information with respect to the background, the image is just distorted.

Figure 4A:
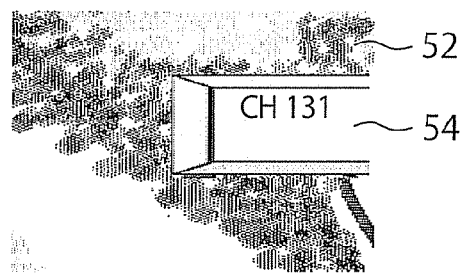
FIGS. 4A and 4B are parallax images for left eye and for right eye, respectively.
Figure 4B:
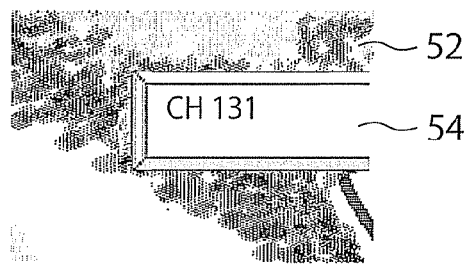

The second multiple parallax image generator 8 generates multiple parallax images based on the OSD information transmitted through the transmission system 40. The number of the viewpoints of the parallax images generated by the second multiple parallax image generator 8 is the same as that of parallax images generated by the first multiple parallax image generator 7. For example, it is assumed that the OSD is "CH 131" of FIG. 2 indicative of the channel number and that the first multiple parallax image generator 7 generates two parallax images. A parallax image for left eye (FIG. 4A) and that for right eye (FIG. 4B) are generated as the two parallax images from the original OSD image drawn or set by the OSD drawer 2 by using a shifting filter. Note that, each of FIGS. 4A and 4B shows generated parallax image where a part of the image including the OSD is taken out. In the parallax image for left eye, a rectangle area indicative of the OSD 54 is shifted to the right, while in the parallax image for right eye, a rectangle area indicative of the OSD 54 is shifted to the left. In this time, the background is not shifted, which may cause distortion at the boundary between the OSD 54 and the background. Because of this distortion, an edge part of the rectangle area may be unsharp and disturbed. On the other hand, with regard to the depth information, the depth information of the object 50 of FIG. 2 is independent of that of OSD 54. However, since the second multiple parallax image generator 8 generates the parallax images by using the depth information of the OSD 54, the distortion does not occur in the background area 52.

In the present embodiment, in order to prevent the unsharp and disturbed image from being generated at the edge part of the area where the OSD is displayed due to the distortion, the multiple parallax images of the OSD generated by the second multiple parallax image generator 8 are superimposed on the multiple parallax images generated by the first multiple parallax image generator 7 using the blend information α.

Figure 5:
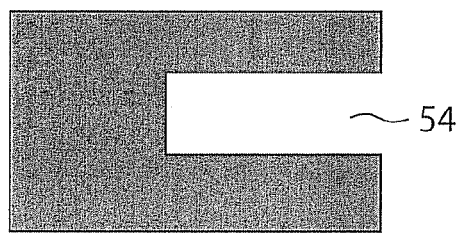
FIG. 5 is a diagram for explaining the blend information of the OSD.
Figure 6A:
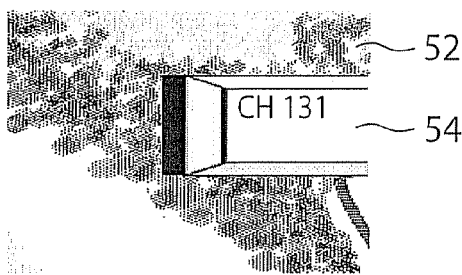
FIGS. 6A and 6B are parallax images for left eye and right eye respectively obtained using the blend information of FIG. 5.
Figure 6B:
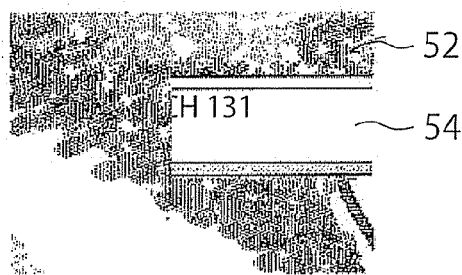

The superimposing module 9 performs this superimposing processing. The blend information α at the area showing the original OSD drawn or set by the OSD drawer 2 as shown in FIG. 5 is different from that at the area of the OSD in the parallax images as shown in FIGS. 4A and 4B. Therefore, if the OSD 54 is superimposed on the background 52 simply, a black part may be generated because the background area 52 is replaced by a part where the OSD 54 does not exist as shown in FIG. 6A, or a part of OSD 54 may be lacked as shown in FIG. 6B.

Therefore, in the present embodiment, an area 60 seen at nearer-side comparing to the background, namely, the area 60 having larger depth information is set at an area obtained by spreading the OSD image 54 to left and right directions (horizontal direction of the display) in the display as shown in FIG. 7. As a result, the area 60 is wider than the OSD image 54 of FIGS. 4A and 4B. For example, the depth information whose area is spread to the left and the right directions can be realized by using a maximum value of data obtained by shifting the data (value) of the depth information to the left direction and data obtained by shifting the data (value) of the depth information to the right direction. Or, the data (value) of the depth information spread to the left and the right direction can be set in the OSD drawer 2 in advance. The data is set at generating the OSD data, for example. Because of this, a changing point 62 of the depth information value locates at a position where the blend information α is "0", namely, the image is transparent. Note that, in FIG. 7, an area 64 indicates an area where the blend information α is "0". Therefore, setting the area obtained by spreading the OSD image 54 to the left and the right directions in the display, as the area 60 means spreading the area where the blend information α of the OSD image is "0" to the left and the right directions, and further means that the blend information α of the OSD image is modified or changed based on the depth information of the OSD.

Accordingly, the multiple parallax images are generated by the second multiple parallax image generator 8 based on the depth information of the OSD, and with respect to each of the parallax images, the blend information α is modified or changed based on the depth information of the OSD to the OSD image area shifted to the left and the right direction based on the depth information. For example, FIGS. 8A and 8B show the blend information α modified or changed based on the depth information of the OSD in a case where the second multiple parallax image generator 8 generates the parallax images for left eye and the right eye. Here, In FIGS. 8A and 8B, the reference numeral 66 indicates an area where the blend information α is not "0", and the reference numeral 68 indicates a boundary between an area where the modified or changed blend information α is "0" and an area where the α is not "0".

Like this, in the present embodiment, a transparent part of the image, namely, the blend information α is "0" is deformed on generating the multiple parallax image. Therefore, the rectangle area indicative of the OSD image 54 is not deformed.

The superimposing module 9 superimposes the multiple parallax images of the OSD generated by the second multiple parallax image generator 8 on the multiple parallax images generated by the first multiple parallax image generator 7 using the blend information α modified or changed based on the depth information of the OSD by the second multiple parallax image generator 8 to generate a superimposed multiple parallax images based on the following equation.

$$C = A\left(\frac{M-\alpha}{M}\right) + B\frac{\alpha}{M}$$

Here, the "M" is a maximum value of the blend information α modified or changed based on the depth information of the OSD, the "A" is a pixel value of the multiple parallax images generated by the first multiple parallax image generator 7, the "B" is a pixel value of the multiple parallax images generated by the second multiple parallax image generator 8, the "C" is a pixel value of the multiple parallax images generated by the superimposing module 9. For example, when the blend information α is expressed by n bits, $M=2^n-1$.

The superimposing module 9 sorts the multiple parallax images obtained by such a manner for three-dimensional display and sends them to the display 10. Then, the display 10 displays them. The image for three-dimensional display can be obtained where the edges of the OSD image 54 are not lack and are clearly kept as the original image and undesired color is not added on the image. For example, FIG. 9A shows a parallax image for left eye and FIG. 9B shows a parallax image for left eye. As shown in FIGS. 9A and 9B, natural and clear three-dimensional OSD is obtained.

Hereinafter, the transmission system 40, which is one of the characteristic features, will be explained in detail.

Figure 10:
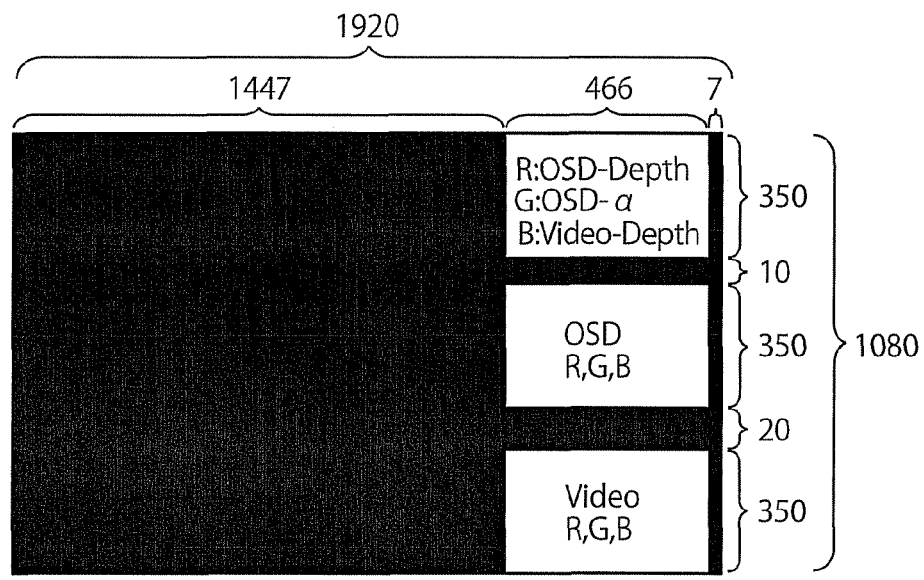
FIG. 10 is a diagram showing a transmission format according to the first embodiment.
Figure 11:
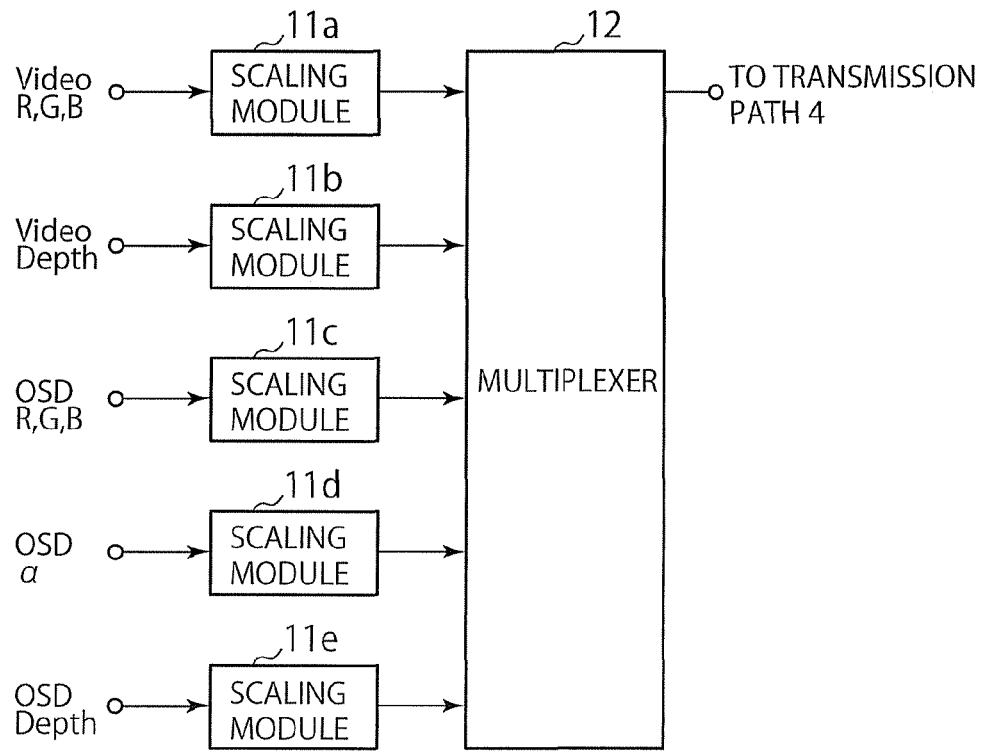
FIG. 11 is a schematic block diagram showing an example of an internal configuration of the transmitter 3.

FIG. 10 is a diagram showing a transmission format according to the first embodiment. FIG. 11 is a schematic block diagram showing an example of an internal configuration of the transmitter 3. In FIGS. 10 and 11, it is assumed that the image signal and the OSD are blended and displayed on the display 10 of "12" inch size having "466" pixels in the horizontal direction and "356" pixels in the vertical directions (466*350, first resolution), for example. Firstly, a case will be explained where the image signal having the depth information is inputted to the image processing module 1, namely, the image processing module 1 generates the multiple parallax image signals each pixel in which has the depth information in addition to the R, G and B brightness values.

The R, G and B brightness values of the image signal (Video R, G, B), the depth information of the image signal (Video Depth), the R, G and B brightness values of the OSD (OSD R, G, B), the blend information α of the OSD (OSD α), and the depth information of the OSD (OSD Depth) are inputted to the transmitter 3 of FIG. 11. The transmitter 3 has scaling modules 11a to 11e corresponding thereto respectively, and a multiplexer 12 for multiplexing the outputs of the scaling modules 11a to 11e.

The scaling module 11a scales (scales up or scales down) the image signals so that the resolution of the image signal becomes 466*350, which is equal to that of the display 10. For example, if the resolution of the inputted image signal is 1920*1080, the scaling module 11a scales down the image signal to a resolution of 466*350 pixels. Similarly, the scaling module 11b, the scaling module 11c, the scaling module 11d and the scaling module 11e scales the depth information of the image signal, the R, G and B brightness values of the OSD, the blend information α of the OSD and the depth information of the OSD to the resolution of 466*350 pixels, respectively. Note that, in a case where the OSD drawer 2 generates the OSD information whose resolution is 466*350, the scaling module 11c to 11e are unnecessary.

The multiplexer 12 converts the scaled image signal information and the OSD information to a signal format capable of being transmitted by the transmission path 4. The transmission path 4 is, for example, an HDMI (High-Definition Multimedia Interface) or an LVDS (Low Voltage Differential Signaling), which can transmit a video signal (transmission signal) having three values (signal lines) of R, G and B and a resolution of 1920*1080 (second resolution). Therefore, the multiplexer 12 multiplies the scaled image signal information and the OSD information as a video signal having three values of R, G and B and a resolution of 1920*1080.

More specifically, as shown in FIG. 10, the multiplexer 12 assigns the R, G and B brightness values of the image signal having a resolution of 466*350 on the R, G and B values at positions (1447, 730) to (1912, 1079), and assigns the R, G and B brightness values of the OSD on the R, G and B values at positions (1447, 360) to (1912, 719). Further, the multiplexer 12 assigns the blend information α of the OSD on the G values at positions (1447, 0) to (1912, 349), the depth information of the OSD on the R value at the same positions and the depth information of the image signal on the B value at the same positions.

Figure 12:
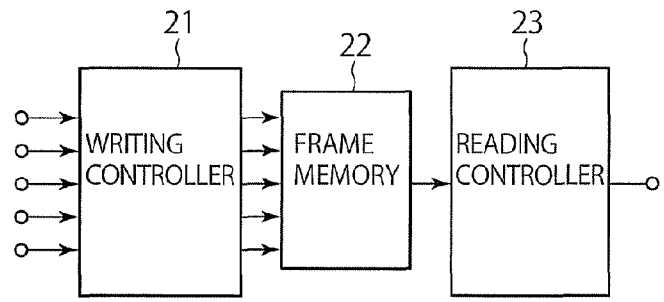
FIG. 12 is a schematic block diagram showing an example of an internal configuration of the multiplexer 12.

FIG. 12 is a schematic block diagram showing an example of an internal configuration of the multiplexer 12. The multiplexer 12 has a writing controller 21, a frame memory 22 which can store the R, G and B values of at least 1920*1080 pixels, and a reading controller 23. The writing controller 21 writes the image signal information and the OSD information of one frame outputted from the scaling modules 11a to 11e in a predetermined region of the frame memory 22. The reading controller 23 reads the image signal information and the OSD information stored in the frame memory 22 and sorting them in the format shown in FIG. 10 to output them as a video signal having R, G and B values of 1920*1080 pixels to the transmission path 4.

The transmission path 4 transmits the video signal to the receiver 5 in the second chip 30 which is different from the first chip 20 on which the transmitter 3 is integrated.

Note that, it is preferable to set pixels at which neither the image signal information nor the OSD information is assigned to a predetermined constant value, for example, black (R, G and B brightness values are "0"). Because of this, it is possible to prevent the undesired noise from occurring when image processing such as filtering processing in a horizontal direction is performed.

By multiplexing the image signal information and the OSD information, the transmission path 4 can transmit efficiently, to the receiver 5, not only the R, G and B brightness values of the image signal and the OSD, but also the blend information α and the depth information of the image signal and the OSD multiplexed as a vide signal.

Note that, although FIG. 10 shows a screen obtained by displaying the video signal transmitted on the transmission path 4, FIG. 10 is only an example and the image signal information and the OSD information are assigned at arbitrary positions as long as they fall in the resolution of the transmission system 40.

Figure 13:
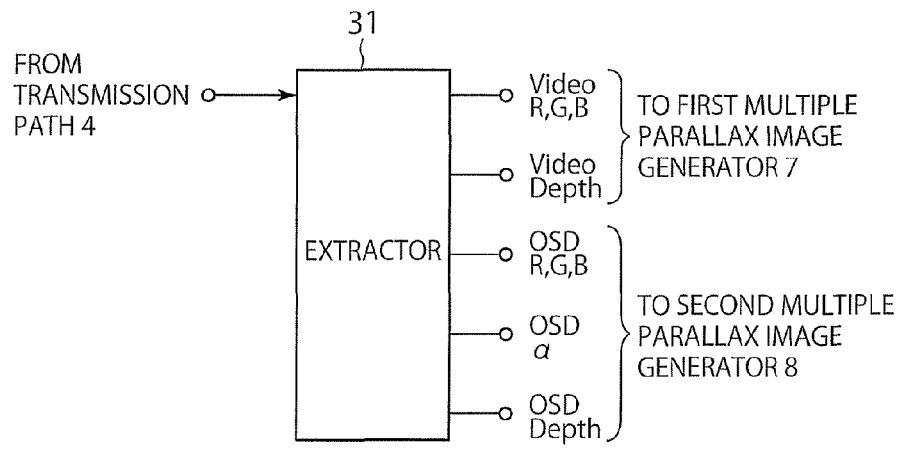
FIG. 13 is a schematic block diagram showing an example of the internal configuration of the receiver 5.
Figure 14:
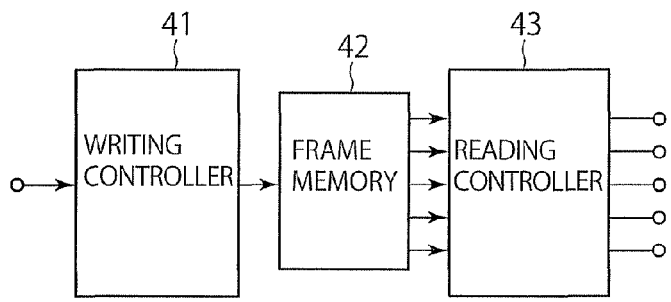
FIG. 14 is a schematic block diagram showing an example of the internal configuration of the extractor 31.

FIG. 13 is a schematic block diagram showing an example of the internal configuration of the receiver 5. The receiver 5 has an extractor 31. FIG. 14 is a schematic block diagram showing an example of the internal configuration of the extractor 31. The extractor 31 has a writing controller 41, a frame memory 42 which can store the R, G and B values of at least 1920*1080 pixels, and a reading controller 43.

The writing controller 41 writes the video signal including the image signal information and the OSD information transmitted from the transmission path 4 in the frame memory 42. The reading controller 43 reads the video signal stored in the frame memory 42 and divides the read video signal into the R, G and B brightness values of the image signal, the depth information of the image signal, the R, G and B brightness values of the OSD, the blend information α of the OSD and the depth information of the OSD. Among them, the image signal information is sent to the first multiple parallax image generator 7, and the OSD information is sent to the second multiple parallax image generator 8.

Then, by above mentioned processing, the superimposing module 9 superimposes the OSD on the image signal and superimposed image is displayed on the display 10.

Above explanation shows an example where the image processing module 1 generates multiple parallax image signals with the depth information are generated. On the other hand, when the image processing module 1 generates multiple two-dimensional image signals without the depth information, the scaling module 11b of the transmitter 3 in FIG. 11 is unnecessary. Furthermore, nothing is assigned on the B values at positions (1447, 0) to (1912, 349), and they are set to a constant value such as black. The other processing is similar to that for two-dimensional image signal.

As stated above, in the first embodiment, the multiplexer 12 is provided in the transmitter 3, and the image signal information and the OSD information are multiplexed and transmitted to the receiver 5 as a video signal. Therefore, even when the image processing module 1 and the OSD drawer 2 are integrated on the first chip 20 while the superimposing module 9 for superimposing the OSD on the image signal is integrated on the second chip 30, it is possible to transmit the image signal information and the OSD information between the chips easily and efficiently.

Second Embodiment

In a second embodiment which will be describe below, the OSD is superimposed on the image signal to be displayed on a display 10 having a resolution larger than that in the first embodiment. Hereinafter, the transmission system 40, which is different from the first embodiment, is mainly explained.

Figure 15:
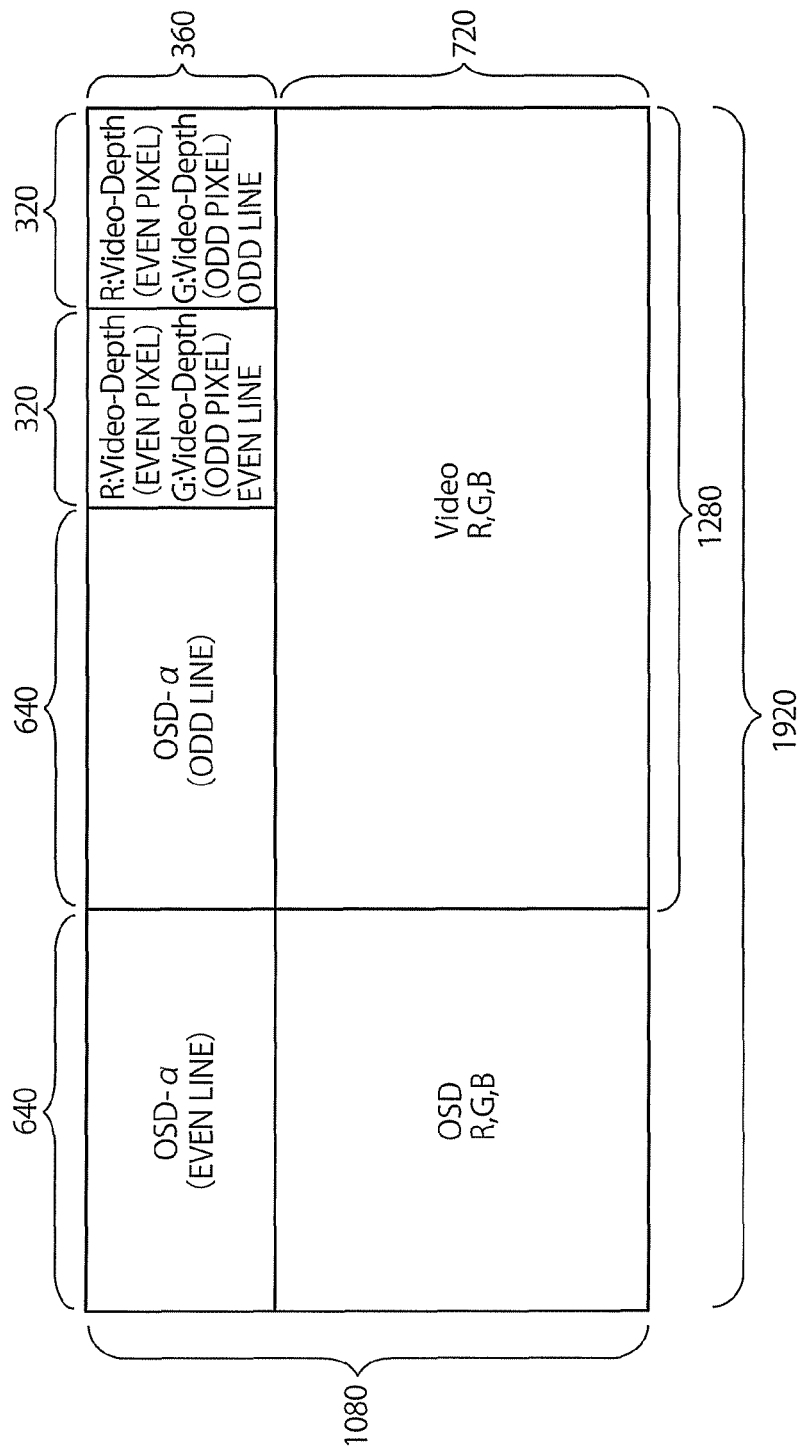
FIG. 15 is a diagram showing a transmission format according to the second embodiment.
Figures 16, 17:
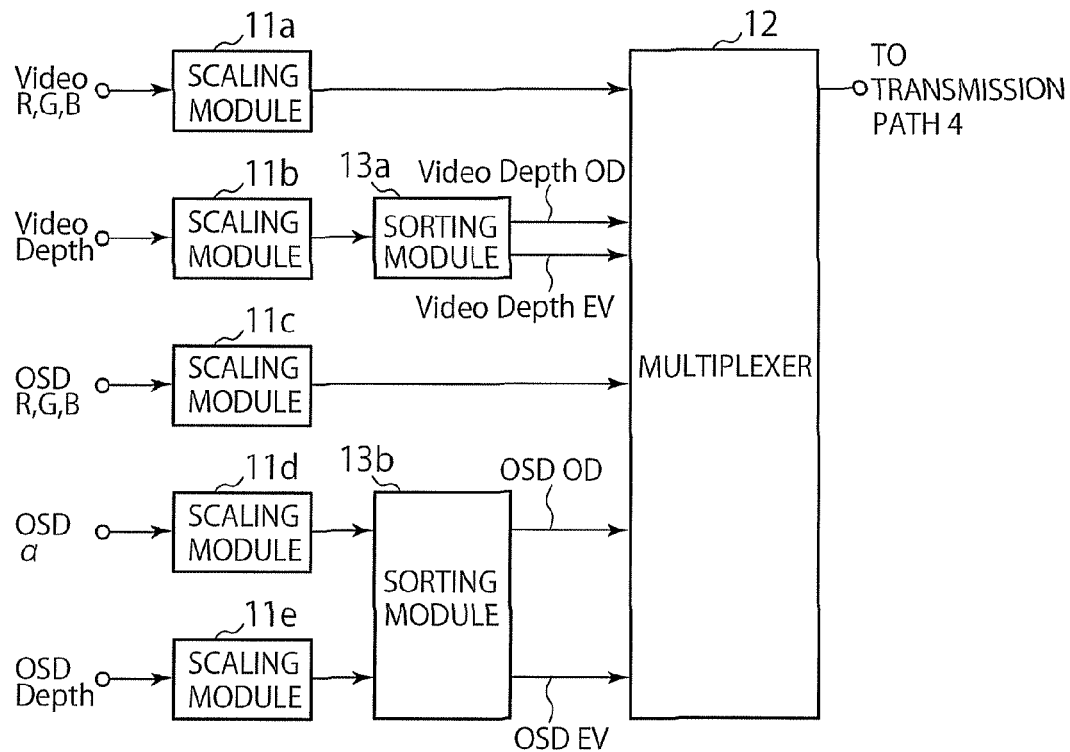
FIG. 16 is a schematic block diagram showing an example of an internal configuration of the transmitter 3'.
FIG. 17 is a diagram showing an arrangement of the depth information of the image signal before sorting.

FIG. 15 is a diagram showing a transmission format according to the second embodiment. FIG. 16 is a schematic block diagram showing an example of an internal configuration of the transmitter 3'. FIGS. 15 and 16 assumes that the OSD is superimposed on the image signal and displayed on the display 10' of "20" inch size having a resolution of 1280*1080 pixels (second resolution), for example. Firstly, a case will be explained where the image processing module 1 generates the multiple parallax image signals with the depth information.

The transmitter 3' of FIG. 16 has sorting modules 13a and 13b in addition to the scaling modules 11a to 11e and the multiplexer 12 similar to FIG. 11.

The scaling module 11a scales the R, G and B brightness values of the image signal to a resolution of 1280*720 pixels. The scaling modules 11b to 11e scale the depth information of the image signal, the R, G and B brightness values, the blend information α and the depth information of the OSD to a resolution of 640*720 pixels, respectively. If the depth information of the image signals and so on are scaled to the resolution of 1280*720 pixels in accordance with the resolution of the display 10', the data amount exceeds a threshold amount the transmission path 4 can transmit. Therefore, in the present embodiment, the resolution in the horizontal direction is half of that of the display 10'.

The sorting module (second sorting module) 13a sorts the scaled depth information of the image signal as following.

FIG. 17 is a diagram showing an arrangement of the depth information of the image signal before sorting. As shown in FIG. 17, before sorting, the depth information is arranged in a displaying order. Note that, (p, q) in FIG. 17 shows a p-th pixel in a q-th line.

Figures 18A, 18B, 18C:
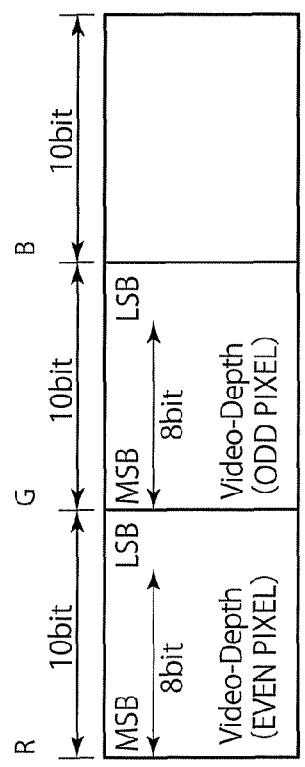
FIGS. 18A and 18B are diagrams showing an example of an arrangement of the depth information of the image signal after sorting.
FIG. 18C is a diagram showing a pixel of FIGS. 18A and 18B in more detail.

FIGS. 18A and 18B are diagrams showing an example of an arrangement of the depth information of the image signal after sorting. Firstly, the sorting module 13a divides the depth information of the image signal into depth information on even lines and that on odd lines. Then, as shown in FIG. 18A, the sorting module 13a arranges the depth information of even pixels among that on the even lines such as (0, 0) and (2, 0) on the R values on the video signal transmitted on the transmission path 4, and arranges the depth information of odd pixels such as (1, 0) and (3, 0) on the G values. Furthermore, as shown in FIG. 18B, the sorting module 13a arranges the depth information of even pixels among that on the odd lines on the R values on the video signal, and arranges the depth information of odd pixels on the G values.

FIG. 18C is a diagram showing a pixel of FIGS. 18A and 18B in more detail. FIG. 18C shows an example where each of the R, G and B values of the video signal transmitted on the transmission path 4 has "10" bit, and the depth information of the image signal has "8" bit. As shown in FIG. 18C, when the number of bits of the R, G and B values is larger than that of bits of the depth information of the image signal, the sorting module 13a may assigned the depth information at upper "8" bits among the "10" bits, for example.

The sorting module 13a sends a signal Video Depth EV which is a signal shown in FIG. 18A and a signal Video Depth OD which is a signal shown in FIG. 18B generated as above to the multiplexer 12. Note that, FIGS. 18A and 18B have 320*360 pixels, respectively.

The sorting module 13b (second sorting module) sorts the blend information α and the depth information of the scaled OSD as following. As well as FIG. 17, before sorting, the blend information α and the depth information are arranged in a displaying order.

Figures 19A, 19B:
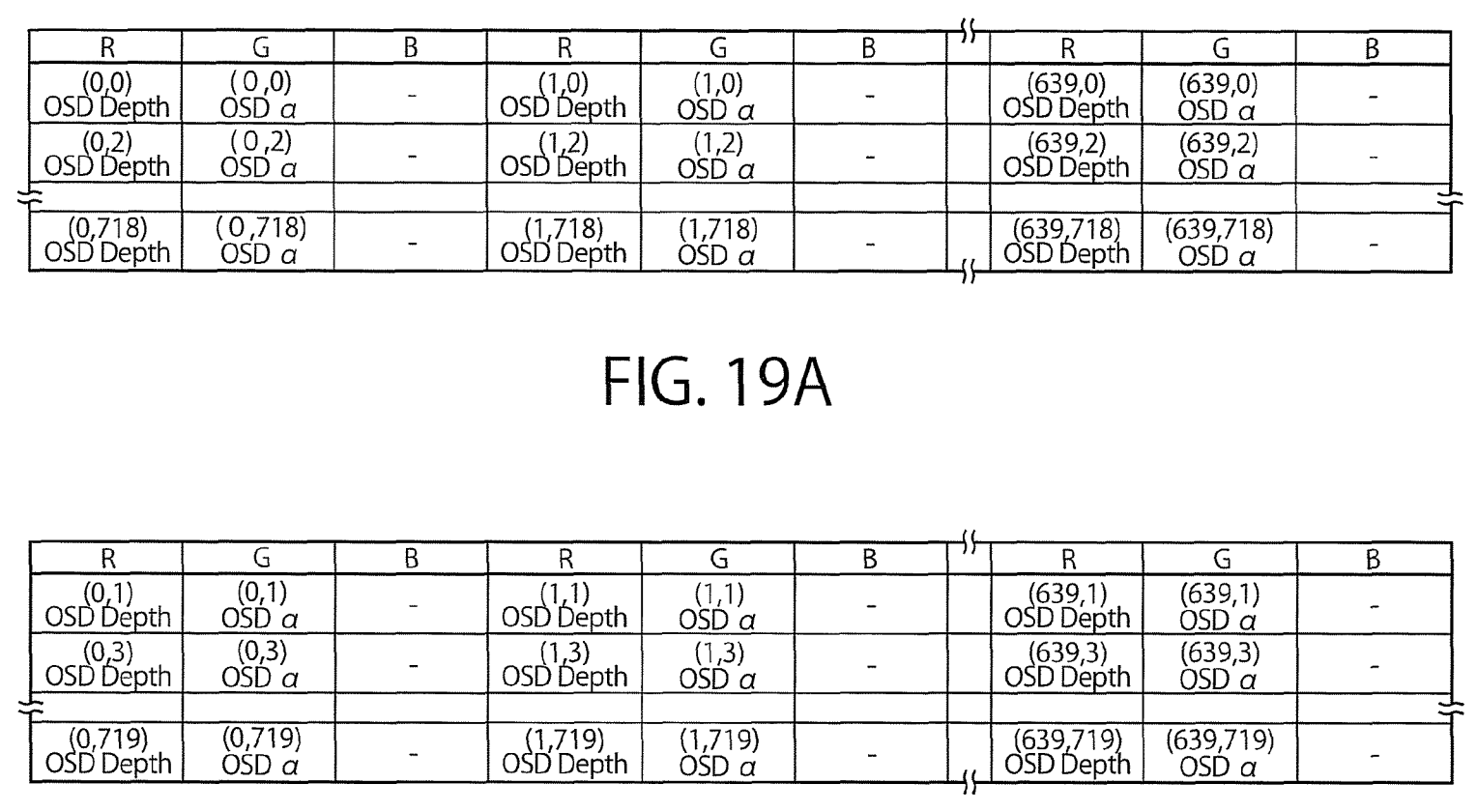

FIGS. 19A and 19B are diagrams showing an example of arrangement of the blend information α and the depth information of the scaled OSD sorted by the sorting module 13b. As well as the sorting module 13a, firstly, the sorting module 13b divides the blend information α and the depth information of the OSD into blend information α and the depth information on even lines and those on odd lines. Then, as shown in FIG. 19A, the sorting module 13b arranges the depth information of the OSD on the even lines on the R values on the video signal transmitted on the transmission path 4 and arranges the blend information α on the even lines on the G values thereon. Similarly, as shown in FIG. 19B, the sorting module 13b arranges the depth information of the OSD on the odd lines on the R values thereon and arranges the blend information α on the odd lines on the G values thereon.

The sorting module 13b sends a signal OSD EV which is a signal shown in FIG. 19A and a signal OSD OD which is a signal shown in FIG. 19B generated as above to the multiplexer 12. Note that, FIGS. 19A and 19B have 640*360 pixels, respectively.

Then, the multiplexer 12 of FIG. 16 assigns the R, G and B brightness values of the image signal having 1280*720 outputted from the scaling module 11a pixels on the R, G and B values at positions (640, 360) to (1919, 1079) of the video signal, assigns the signal Video Depth EV (FIG. 18A) having 320*360 pixels outputted from the sorting module 13a at positions (1280, 0) to (1599, 359), assigns the signal Video Depth OD (FIG. 18B) at positions (1600, 0) to (1919, 359), assigns the R, G and B brightness values of the OSD having 640*720 pixels outputted from the scaling module 11c on the R, G and B values at positions (0, 360) to (639, 1079), assigns the signal OSD EV (FIG. 19A) having 640*360 pixels outputted from the sorting module 13b at positions (0, 0) to (639, 359), assigns the signal OSD OD (FIG. 19B) at positions (640, 0) to (1279, 359). Note that, because the internal configuration of the multiplexer 12 is similar to FIG. 12, the explanation thereof will be omitted.

The video signal shown in FIG. 15 is transmitted from the multiplexer 12 in the transmitter 3' to the receiver 5' through the transmission path 4.

Figure 20:
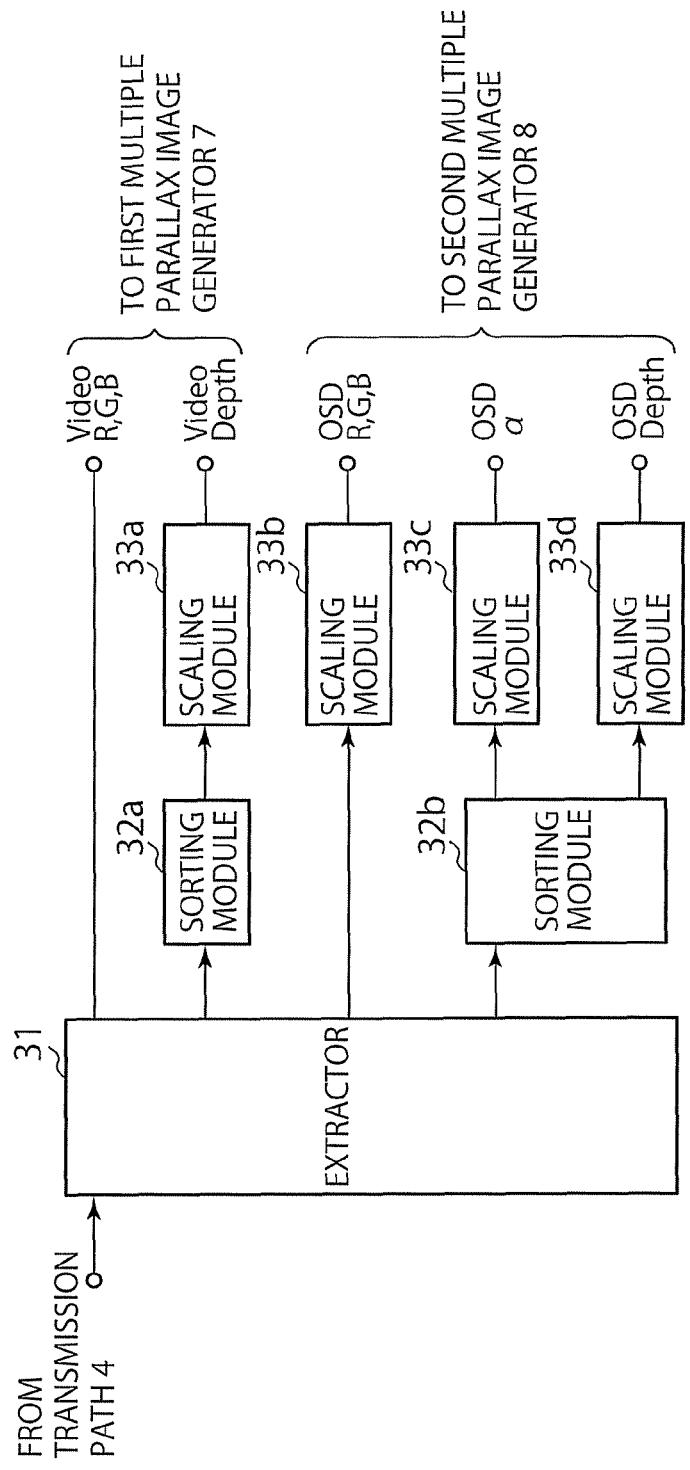
FIG. 20 is a schematic block diagram showing an example of an internal configuration of the receiver 5'.

FIG. 20 is a schematic block diagram showing an example of an internal configuration of the receiver 5'. The receiver 5' has sorting modules 32a and 32b and scaling modules 33a to 33d, in addition to the extractor 31 similar to FIG. 13.

The extractor 31 extracts the R, G and B brightness values of the image signal, the depth information of the image signal, the R, G and B brightness values of the OSD, the blend information α of the OSD, and the depth information of the OSD from the video signal transmitted from the transmission path 4. The sorting module (fourth sorting module) 32a sorts the depth information of the image signal in a format of FIGS. 18A and 18B into a format of displaying order, as shown in FIG. 17. The sorting module (third sorting module) 32b sorts the blend information α and the depth information of the OSD in a format of FIGS. 19A and 19B into a format of displaying order, as shown in FIG. 17.

The extracted R, G and B brightness values of the OSD and the depth information of the sorted image signal, and the blend information and the depth information of the OSD have been scaled by the scaling modules 11b to 11e of FIG. 16 into 640*720 pixels. Therefore, taking the resolution of the display 10' into consideration, the sorting modules 33a to 33d scale them into 1280*720 pixels by doubling them in the horizontal direction. Note that, because the R, G and B brightness values of the image signal have been scaled into 1280*720 pixels by the scaling module 11a of FIG. 20, it is unnecessary to scale them in the receiver 5'.

The image signal information and the OSD obtained by the above having 1280*720 pixels are sent to the first multiple parallax image generator 7 and the second multiple parallax image generator 8, respectively. The following processing is similar to the first embodiment.

Above explanation shows an example where the image processing module 1 generates multiple parallax image signals with the depth information are generated. On the other hand, when the image processing module 1 generates multiple two-dimensional image signals without the depth information, the scaling module 11b and the sorting module 13a of the transmitter 3' of FIG. 16 are unnecessary. Furthermore, nothing is assigned at positions (1280, 0) to (1919, 359). Additionally, the sorting module 32a and the scaling module 33a of FIG. 20 are unnecessary.

The other processing is similar to that for two-dimensional image signal.

As stated above, in the second embodiment, the depth information of the image signal and the OSD information are scaled into a resolution smaller than that of the display 10' to be transmitted from the transmitter 3' to the receiver 5'. Therefore, even when the resolution of the display 10' is large, it is possible to transmit the image signal information and the OSD information between the chips efficiently. Furthermore, because the sorting modules 32a and 32b sort the depth information of the image signal and the OSD information by dividing them into the even lines and the odd lines, information with high resolution can be also transmitted efficiently.

Note that, when the resolution of the display 10' is further larger, it is possible to scale down the R, G and B brightness values of the image signal to be transmitted. However, if the R, G and B brightness values are scaled down, the image quality may be deteriorated. Therefore, it is preferable that the depth information of the image signal and/or the OSD information are scaled down rather than the R, G and B brightness values being scaled down.

Furthermore, in the above embodiments, although an example is shown where the image signal and the OSD have the R, G and B brightness values as signal values, they may have other formatted signal values such as Y (brightness), Cb and Cr (color differences).

At least a part of the transmission system explained in the above embodiments can be formed of hardware or software. When the transmission system is partially formed of the software, it is possible to store a program implementing at least a partial function of the transmission system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the transmission system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A transmitter comprising:
   a multiplexer configured to load a signal value of an image signal of a first resolution, a signal value of an On Screen Display (OSD) configured to be superimposed on the image signal, blend information of the OSD and depth information of the OSD at a first plurality of positions on a transmission signal comprising a second resolution larger than the first resolution, and to transmit the transmission signal to a receiver; and
   a first sorter configured to sort the blend information of the OSD and the depth information of the OSD, to assign the blend information of the OSD at third positions in the transmission signal on a first signal line and to assign the depth information of the OSD at the third positions in the transmission signal on a second signal line different from the first signal line,
   wherein the multiplexer is configured to load:
   the signal value of the image signal at a first position on the transmission signal,
   the signal value of the OSD at a second position on the transmission signal, the second position being different from the first position, and
   the depth information of the OSD at a third position on the transmission signal, the third position being different from the first position and the second position,
   wherein the first sorter is configured to divide the blend information of the OSD and the depth information of the OSD into first information and second information, the first information comprising the blend information of the OSD and the depth information of the OSD for even lines in an image, and the second information comprising the blend information of the OSD and the depth information of the OSD for odd lines in the image, and
   wherein the multiplexer is configured to assign the first information and the second information at separate positions in the transmission signal.

2. The transmitter of claim 1, further comprising a second video scaler configured to convert at least one of the signal value of the OSD, the blend information of the OSD and the depth information of the OSD to a resolution equal to or smaller than the first resolution,
   wherein the multiplexer is configured to assign an output of the second video scaler at the first plurality of positions in the transmission signal.

3. A transmitter comprising:
   a multiplexer configured to load a signal value of an image signal of a first resolution, a signal value of an On Screen Display (OSD) configured to be superimposed on the image signal, blend information of the OSD and depth information of the OSD at a first plurality of positions on a transmission signal comprising a second resolution larger than the first resolution, and to transmit the transmission signal to a receiver; and
   a second sorter configured to divide the depth information of the image signal into the depth information for even lines in an image and the depth information for odd lines in the image,
   wherein the multiplexer is configured to assign:
   the signal value of the image signal at a first position on the transmission signal,
   the signal value of the OSD at a second position on the transmission signal, the second position being different from the first position,
   the depth information of the OSD at a third position on the transmission signal, the third position being different from the first position and the second position, and
   depth information of the image signal at a second plurality of positions in the transmission signal, and assign the depth information of the image signal for the even lines and the depth information for the odd lines at separate positions in the transmission signal.

4. The transmitter of claim 1, wherein the multiplexer is configured to set a first value in positions without assigned information.

5. A receiver comprising:
   an extractor configured to extract a signal value of an image signal of a first resolution, a signal value of an OSD configured to be superimposed on the image signal, blend information of the OSD and depth information of the OSD from a transmission signal of a second resolution larger than the first resolution, the signal value of the image signal, the signal value of the OSD, the blend information of the OSD and the depth information of the OSD being loaded at a first plurality of positions on the transmission signal, the transmission signal being transmitted from a transmitter, and
   a third sorter configured to extract the blend information of the OSD and the depth information of the OSD from the transmission signal,
   wherein the signal value of the image signal is loaded at a first position on the transmission signal,
   the signal value of the OSD is loaded at a second position, the second position being different from the first position and the depth information of the OSD is loaded at a third position, the third position being different from the first position and the second position, wherein the blend information of the OSD is assigned at first positions of a first signal line in the transmission signal, and the depth information of the OSD is assigned at the first positions of a second signal line different from the first signal line in the transmission signal wherein the blend information of the OSD and the depth information of the OSD for even lines in an image, and the blend information of the OSD and the depth information of the OSD for odd lines in the image are assigned at separate positions in the transmission signal, and wherein the third sorter is configured to sort the blend information of the OSD and the depth information of the OSD in a displaying order.

6. The receiver of claim 5, further comprising a video scaler configured to convert information to the first resolution, wherein at least one of the signal value of the OSD, the blend information of the OSD and the depth information of the OSD has been converted to a third resolution smaller than the first resolution, and wherein the scaling module is configured to convert the converted information of the third resolution to the first resolution.

7. A receiver comprising:

an extractor configured to extract a signal value of an image signal of a first resolution, a signal value of an OSD configured to be superimposed on the image signal, blend information of the OSD and depth information of the OSD from a transmission signal of a second resolution larger than the first resolution, the signal value of the image signal, the signal value of the OSD, the blend information of the OSD and the depth information of the OSD being loaded at a first plurality of positions on the transmission signal, the transmission signal being transmitted from a transmitter, and a fourth sorter configured to sort the depth information of the image signal in a displaying order, wherein the signal value of the image signal is loaded at a first position on the transmission signal, the signal value of the OSD is loaded at a second position, the second position being different from the first position, the depth information of the OSD is loaded at a third position, the third position being different from the first position and the second position, and the depth information of the image signal for even lines in an image and the depth information of the image signal for odd lines in the image are assigned at separate positions in the transmission signal, wherein depth information of the image signal is assigned at a second plurality of positions in the transmission signal, and the extractor is configured to extract the depth information of the image signal from the transmission signal.

8. A transmission system comprising:
a transmitter;
a receiver; and
a transmission path configured to transmit a transmission signal from the transmitter to the receiver, wherein the transmitter comprises:

a multiplexer configured to load a signal value of an image signal of a first resolution, a signal value of an OSD configured to be superimposed on the image signal, blend information of the OSD and depth information of the OSD at a first plurality of positions on the transmission signal comprising a second resolution larger than the first resolution, and to transmit the transmission signal to the receiver, wherein the multiplexer is configured to load:

the signal value of the image signal at a first position on the transmission signal, the signal value of the OSD at a second position on the transmission signal, the second position being different from the first position, and the depth information of the OSD at a third position on the transmission signal, the third position being different from the first position and the second position, and the receiver comprises an extractor configured to extract the signal value of the image signal, the signal value of the OSD, the blend information of the OSD and the depth information of the OSD from the transmission signal, the transmission signal being transmitted from the transmitter, wherein the system further comprises:

a first multiple parallax image generator configured to generate a plurality of parallax images from the extracted image signal based on depth information of the image signal;

a second multiple parallax image generator configured to generate a plurality of parallax images from the extracted OSD based on the extracted depth information of the OSD;

a superimposing module configured to superimpose the parallax images of the OSD on the parallax images of the image signal into a superimposed image, based on extracted blend information of the OSD; and a display of the first resolution configured to display the superimposed image.

9. The system of claim 8, wherein the transmission path is a High-Definition Multimedia Interface (HDMI) or a Low Voltage Differential Signaling (LVDS).

10. The transmitter of claim 1 further comprising a first video scaler configured to convert an image signal from a current resolution to the first resolution.

* * * * *